United States Patent
Yamada

(10) Patent No.: US 7,898,206 B2
(45) Date of Patent: Mar. 1, 2011

(54) STEPPING MOTOR DRIVE

(75) Inventor: Yoshihisa Yamada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 512 days.

(21) Appl. No.: 12/081,084

(22) Filed: Apr. 10, 2008

(65) Prior Publication Data

US 2008/0197798 A1    Aug. 21, 2008

(30) Foreign Application Priority Data

Jul. 25, 2006    (JP) .............................. 2006-201792

(51) Int. Cl.
    *H02P 8/00* (2006.01)
(52) U.S. Cl. ...................... 318/696; 318/685
(58) Field of Classification Search .................. 318/696, 318/685, 432, 434, 433
    See application file for complete search history.

(56) References Cited

U.S. PATENT DOCUMENTS

2002/0189397 A1 *  12/2002  Sakamoto et al. ............. 74/661

FOREIGN PATENT DOCUMENTS

| JP | 2004-364403 | 12/2004 |
|----|-------------|---------|
| JP | 2008-029162 | 2/2008  |

* cited by examiner

*Primary Examiner*—Karen Masih
(74) *Attorney, Agent, or Firm*—Edwards Angell Palmer & Dodge LLP

(57) ABSTRACT

A stepping motor drive is provided, by which a recoil movement of a driven member upon an initialization action can be reduced. The stepping motor drive includes: a drive signal supply means which supplies a plurality of periodic drive signals having different phases from each other to generate a rotation torque in a stepping motor, one electric cycle being constructed by a plurality of excitation steps; a control means which makes the drive signal supply means supply the drive signal upon a initialization action in which a driven member connected with rotation of the stepping motor is made abut against a stopper; and a first storing means which stores a torque control parameter according to an inversion phase characteristic intrinsic to the stepping motor.

9 Claims, 9 Drawing Sheets

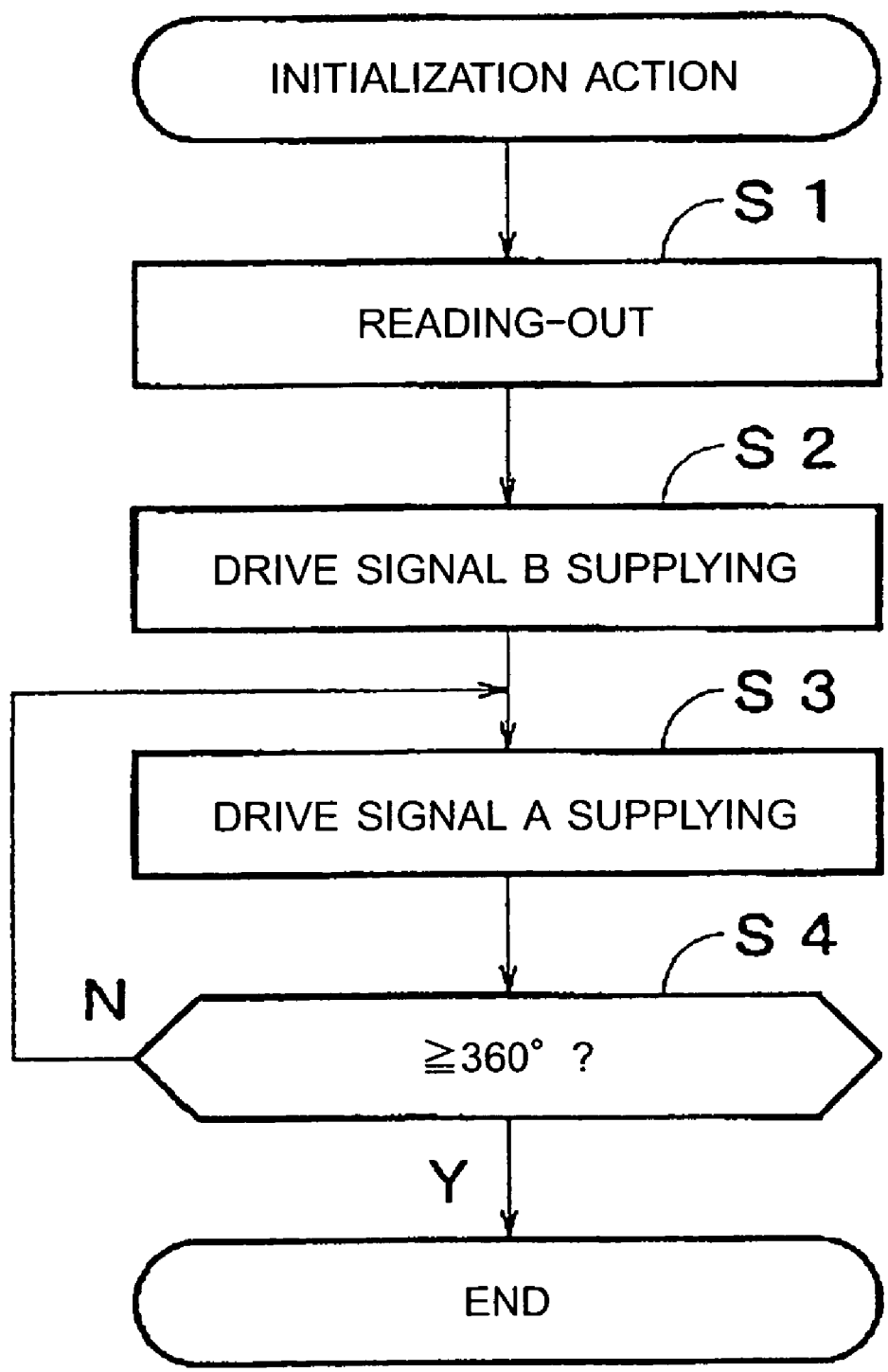

STEPPING MOTOR DRIVE

BACKGROUND OF THE INVENTION

(1) Field of the Invention

The present invention relates to a stepping motor drive (that is, a driving device of a stepping motor).

(2) Description of the Related Art

So far, for example, an indicating device for use in a vehicle has been known as a device which uses a stepping motor drive. The indicating device indicates measured values measured by various sensors with a pointer. A stepping motor is used to drive the pointer.

A stepping motor drive, which drives the stepping motor, rotates the stepping motor in response to a moving quantity ($\theta$-$\theta'$) which is a difference between a present angle position $\theta'$ of a pointer and a target angle position $\theta$ thereof. Thereby, the pointer is moved by the moving quantity ($\theta$-$\theta'$) so as to indicate the target angle position $\theta$. The target angle position $\theta$ is updated to an angle datum $\theta i$ whenever the angle datum $\theta i$ is inputted, said angle datum $\theta i$ being computed on the basis of a measured value measured by various sensors.

The stepping motor drive supplies periodic drive signals having phases different from each other so as to periodically change an excitation state of an excitation coil in the stepping motor, so that a magnet rotor surrounded by the excitation coil is allowed to generate rotation torque, thereby rotating the stepping motor.

The indicating device might possibly have a step-out problem in which an actual moving quantity of the pointer is different from the moving quantity ($\theta$-$\theta'$) which is what it should be, due to inputting of the angle datum $\theta i$ superimposed with a vibration or noise of a vehicle. When such a step-out is repeated, an error takes place between a measured value indicated by the pointer and a measured value measured by the various sensors and therefore, a proper indication cannot be performed.

In order to solve such a problem, the stepping motor is provided with: an abutting piece as a driven member which interlocks with rotation of the stepping motor; and a stopper which mechanically stops the rotation of the stepping motor by abutting against the abutting piece. The stopper is formed in such a manner that the pointer indicates a measured value being zero when the stopper abuts against the abutting piece.

For example, the stepping motor drive rotates the stepping motor so that the abutting piece approaches the stopper whenever a power supply is turned on, so that the abutting piece is forced to abut against the stopper, thereby performing an initialization action in which the pointer is forced to stop at a position of the measured value being zero.

By performing the initialization action, when the present position $\theta'$ is recognized to be the measured value being zero, the pointer also actually indicates the measured value being zero. Accordingly, an error between the measured value indicated by the pointer and the measured value measured by the various sensors can be reset.

However, as for the indicating device described above, it is not known where the abutting piece is positioned upon the initialization, therefore it is necessary to rotate the abutting piece, for example, by 360° in order to make the abutting piece securely abut against the stopper. Therefore, even when the abutting piece abuts against the stopper during the rotation thereof within 360° and the stepping motor cannot rotate further in a direction facing the stopper, such a condition takes place that the excitation state of the excitation coil in the stepping motor continues to periodically change.

On such a condition described above, the stepping motor generates alternately a rotation torque in the direction approaching the stopper and a rotation torque in the direction leaving the stopper while the excitation state of the excitation coil changes by one cycle. Thereby, abutting of the abutting piece against the stopper and recoiling of the abutting piece leaving from the stopper are alternately repeated and thereby, the pointer behaves to recoil from the indicated position of the measured value being zero, causing a problem that the pointer looks unattractive upon the action of initialization.

In order to reduce such a recoil movement of the pointer, there is a method of reducing the rotation torque within a specific phase range upon the action of initialization of the stepping motor (for example, see Japanese Patent Application Laid-Open No. 2004-364403).

FIG. 5 shows an indicating device equipped with a conventional stepping motor drive, in which the method described above is implemented. The indicating device includes a stepping motor 1, a pointer 2 driven by the stepping motor 1, and a driving section 3 controlling rotation of the stepping motor 1. The stepping motor 1 includes: two excitation coils 1a1 and 1a2; a magnet rotor 1b rotating in response to a change in the excitation state of the excitation coils 1a1 and 1a2, the magnet rotor 1b being subjected to magnetization of five N-poles and five S-poles arranged alternately; and a gear 1c which transmits driving force of the magnet rotor 1b to the pointer 2.

The stepping motor 1 further includes: an abutting piece 1d, which is formed on the back side of the gear 1c situated on the side of the pointer 2 and is a driven member that interlocks with rotation of the magnet rotor 1b; and a stopper 1e, which is formed in a receiving case (not shown in the figure) receiving the excitation coils 1a1 and 1a2, the magnet rotor 1b, the gear 1c and the abutting piece 1d, and mechanically stops the rotation of the magnet rotor 1b by abutting against the abutting piece 1d. The stopper 1e is formed in such a manner that the pointer 2 indicates a scale of the measured value being zero on a dial from the above when the stopper 1e abuts against the abutting piece 1d.

Hereinafter, in this specification, a rotation direction of the stepping motor 1, in which the abutting piece 1d approaches the stopper 1e, is defined as a reverse rotation direction, while a rotation direction of the stepping motor 1, in which the abutting piece 1d leaves the stopper 1e, is defined as a normal rotation direction.

The driving section 3 consists of a microcomputer including: a central processing unit (CPU) 3a, which performs various processing and control according to a predetermined program; a read only memory (ROM) 3b, which stores a program and so on for the CPU 3a; and a random access memory (RAM) 3c, which stores various data and has an area required for the processing of the CPU 3a.

The excitation coils 1a1 and 1a2 in the stepping motor 1 are connected to the driving section 3. Receiving the periodic drive signals outputted from the driving section 3, the excitation state of each of the excitation coils 1a1 and 1a2 changes, so that a rotation torque is generated in the magnet rotor 1b. An inputting of the power supply is started in the driving section 3, for example, on a timing of turning-on of an ignition switch.

In the following, as for the indicating device having such a construction as described above, a processing sequence of the initialization action performed by the CPU 3a will be explained with reference to a flow chart shown in FIG. 6. When an inputting of the power supply from an on-vehicle battery is carried out, the CPU 3a starts the initialization action. First, a present position $\theta'$ of the pointer 2 stored in the RAM 3c is read out (step S1). The present position θ' of the pointer 2 of course also corresponds to a present position of the abutting piece 1d.

The RAM 3c belongs to a nonvolatile-type, in which the contents are maintained therein even in the event of cutting off of the power supply. That is, if the start of the inputting of the power supply is a recover from a condition, in which the inputting of the power supply to the driving section 3 is provisionally cut off, in response to a start of an engine, the present position θ' of the pointer 2 stored in the RAM 3c corresponds to a position indicated by the pointer 2 before the provisional cutting-off.

Then, the CPU 3a supplies a drive signal B of the reverse rotation direction to the stepping motor 1 by an amount, which corresponds to a difference (−θ') between the read-out present position θ' and an initial position 0° (i.e. the stopper position) (step S2). By the processing at the step S2, the abutting piece 1d and the pointer 2 rotate in the reverse rotation direction by an amount of −θ'.

FIG. 7A is an example of a torque control pattern illustrating a relation between a phase φ of a drive signal B and a rotation torque generated in the stepping motor 1 in the indicating device shown in FIG. 5. FIG. 7B is a time chart illustrating a COS current and a SIN current based on the torque control pattern shown in FIG. 7A. As shown in FIGS. 7A and 7B, the driving section 3 supplies such a drive signal B that a rotation torque T generated in the stepping motor 1 always stays constant. At that time, a COS current having a constant amplitude and a SIN current having a phase shifted by 90° with respect to the COS current shown in FIG. 7B flow in the excitation coils 1a1 and 1a2. Upon a normal action, in which a measured quantity on a traveling condition of a vehicle is indicated, the driving section 3 supplies such a drive signal B of the normal rotation direction that the rotation torque T always stays constant. On the other hand, at step S2 upon the initialization action, a drive signal B of the reverse rotation direction shown in FIG. 7A.

When the outputting of the drive signal B is finished, the CPU 3a supplies a drive signal A of the reverse rotation direction to the stepping motor 1 (step S3). By the processing at step S3, the pointer 2 rotates toward the measured value being zero while the abutting piece 1d rotates toward the stopper 1e.

FIG. 8A is an example of a torque control pattern illustrating a relation between a phase φ of a drive signal A and a rotation torque generated in the stepping motor 1 in the indicating device shown in FIG. 5. FIG. 8B is a time chart illustrating a COS current and a SIN current based on the torque control pattern shown in FIG. 8A. As shown in FIGS. 8A and 8B, the driving section 3 supplies such a drive signal A that with respect to a first rotation torque generated in the stepping motor 1 upon supplying the drive signal A for a phase range R2 (from 0° to 180°) in one electric cycle, a second rotation torque generated in the stepping motor 1 upon supplying the drive signal A for a remaining phase range R1 (from 180° to 360°) in the one electric cycle becomes a half of the first rotation torque. At that time, as shown in FIG. 8B, a COS current and a SIN current, in which the amplitude for the phase range R1 is a half of amplitude for the phase range R2, flow in the excitation coils 1a1 and 1a2.

Thus, if the drive signal A of the reverse rotation direction is supplied to the stepping motor 1 at step S3, the rotation torque generated in the stepping motor 1 can be made small for the phase range R1, in which the rotation torque of the normal rotation direction, that is, the rotation torque of a direction in which the abutting piece 1d recoils from the stopper 1e is generated. Therefore, the speed of reversing from the reverse rotation direction to the normal rotation direction becomes low and therefore, the abutting piece 1d can be prevented from recoiling. On the other hand, a large rotation torque is generated for the phase range R2, in which the rotation torque of the reverse rotation direction, that is, the rotation torque of a direction in which the abutting piece 1d is pressed to the stopper 1e is generated and therefore, the abutting piece 1d can be further prevented from recoiling.

Then, waiting the abutting piece 1d to rotate by 360° (Y at step S4), the CPU 3a halts to supply the drive signal A, so that the processing is finished.

In the method as described above, upon the initialization action when the abutting piece 1d connected with the rotation of the stepping motor is made abut against the stopper 1e, the driving section 3 supplies such a drive signal A that the rotation torque generated in the stepping motor 1 when the drive signal A is supplied for a predetermined phase range R1 of phase angle 360° becomes smaller than the rotation torque generated when the drive signal A is supplied for a remaining phase range R2 of the phase angle 360°, and the magnitude of the rotation torque generated in the stepping motor 1 is controlled for a specific phase range. Thereby, the recoil movement of the abutting piece 1d can be reduced and therefore, the recoil movement of the pointer 2 can be reduced.

However, in the method described above, there is dispersion in a phase angle (i.e. excitation position) at which the inversion of the magnet rotor 1b in the stepping motor 1 takes place due to dispersion in backlash of the gear 1c, dispersion in a forming position of the stopper 1e and dispersion in a magnetization width of a N-pole and a S-pole of the magnet rotor 1b, and a phase angle at which an inversion torque is generated varies depending on an individual motor, causing a problem that there is dispersion in the movement of the pointer 2 upon the initialization action described above.

That is, as shown in FIG. 9, in each case when a motor a is used, when a motor b is used and when a motor c is used as the stepping motor 1 with respect to a start point 180° of the phase range R1, which is set to control a torque upon the recoiling of the abutting piece 1d, there is dispersion in a phase angle (i.e. excitation position) at which the inversion from the reverse rotation direction to the normal rotation direction takes place, and a start position of actual recoiling of the abutting piece 1d formed in each motor is shifted from the starting point 180° of the set phase range R1, causing a problem that there is dispersion in the movement of the pointer 2.

SUMMARY OF THE INVENTION

It is therefore an objective of the present invention to solve the above problems and to provide a stepping motor drive, by which the movement of the driven member upon the initialization action can be reduced.

In order to attain the above objective, the present invention is to provide a stepping motor drive including:

a drive signal supply means which supplies a plurality of periodic drive signals, which construct one electric cycle by a plurality of excitation steps and have different phases from each other to generate a rotation torque in a stepping motor, wherein the drive signal supply means supplies the drive signal so that a first rotation torque generated in the stepping motor in a first phase range of one electric cycle of the drive signal becomes smaller than a second rotation torque generated in the stepping motor in a second phase range which is a remaining phase range other than the first phase range of the one electric cycle;

a control means which makes the drive signal supply means supply the drive signal upon a initialization action in which a driven member connected with rotation of the stepping motor is made abut against a stopper, wherein on a condition that the driven member abuts against the stopper by a rotation in a first rotation direction in which the driven member approaches the stopper, when the drive signal supply means continues to supply the drive signal of the first rotation direction, the first phase range includes a phase range in which a rotation torque in a second rotation direction reverse to the first rotation direction is generated in the stepping motor; and a first storing means which stores a torque control parameter according to an inversion phase characteristic intrinsic to the stepping motor, wherein the control means makes the drive signal supply means supply the drive signal, in which the first and second phase ranges are set on the basis of the torque control parameter stored in the first storing means, to the stepping motor.

With the construction described above, since the torque control parameter intrinsic to the stepping motor is stored, therefore a torque control range can be set in accordance with the inversion phase characteristic intrinsic to the stepping motor and therefore, the recoil of the driven member from the stopper due to the dispersion in the inversion phase characteristic of the stepping motor can be reduced.

The first storing means stores, as the torque control parameter, a recoil excitation step number, a recoil excitation step being an excitation step at a start point of a phase range in which a rotation torque in the second rotation direction reverse to the first rotation direction is generated in the stepping motor, wherein the control means computes a drive table for setting the rotation torque of the drive signal including the first and second phase ranges on the basis of the recoil excitation step number stored in the first storing means, and makes the drive signal supply means supply the stepping motor with the drive signal, in which the first and second phase ranges are set, on the basis of the computed drive table.

With the construction described above, since the torque control range can be set on the basis of the recoil excitation step number intrinsic to the stepping motor, therefore the recoil of the driven member from the stopper due to the dispersion in the inversion phase characteristic of the stepping motor can be reduced.

The stepping motor drive further includes a second storing means which stores a drive table for setting the rotation torque of the drive signal, wherein the control means makes the drive signal supply means supply the stepping motor with the drive signal, in which the first and second phase ranges are set, on the basis of the torque control parameter stored in the first storing means and the drive table stored in the second storing means.

With the construction described above, since the torque control range can be set on the basis of the recoil excitation step number intrinsic to the stepping motor stored in the first storing means and the drive table stored in the second storing means, therefore the recoil of the driven member from the stopper due to the dispersion in the inversion phase characteristic of the stepping motor can be reduced.

The first storing means stores, as the torque control parameter, a recoil excitation step number, a recoil excitation step being an excitation step at a start point of a phase range in which a rotation torque in the second rotation direction reverse to the first rotation direction is generated in the stepping motor, wherein the second storing means stores a plurality of the drive tables having different start points of the first phase range from each other, each said drive table including the first and second phase ranges, wherein the control means selects the drive table, in which the start point of the first phase range is adapted to the recoil excitation step number stored in the first storing means, from a plurality of the drive tables stored in the second storing means, and makes the drive signal supply means supply the stepping motor with the drive signal, in which the first and second phase ranges are set, on the basis of the selected drive table.

With the construction described above, since the torque control range can be set by selecting the drive table adapted to the inversion phase characteristic of the stepping motor from a plurality of the drive tables stored in the second storing means, therefore the recoil of the driven member from the stopper due to the dispersion in the inversion phase characteristic of the stepping motor can be reduced.

The first storing means stores, as the torque control parameter, a recoil excitation step number, a recoil excitation step being an excitation step at a start point of a phase range in which a rotation torque in the second rotation direction reverse to the first rotation direction is generated in the stepping motor, wherein the second storing means stores the drive table including the first and second phase ranges, wherein the control means shifts the drive table so that a start point of the first phase range in the drive table stored in the second storing means coincides with the recoil excitation step number stored in the first storing means, and makes the drive signal supply means supply the stepping motor with the drive signal, in which the first and second phase ranges are set, on the basis of the shifted drive table.

With the construction described above, since the torque control range can be set by shifting the drive table stored in the second storing means so as to be adapted to the inversion phase characteristic of the stepping motor, therefore the recoil of the driven member from the stopper due to the dispersion in the inversion phase characteristic of the stepping motor can be reduced.

The first storing means stores, as the torque control parameter, a recoil excitation step number as expressing a start point of the first phase range, a recoil excitation step being an excitation step at a start point of a phase range in which a rotation torque in the second rotation direction reverse to the first rotation direction is generated in the stepping motor, wherein the second storing means stores the drive table, in which the whole of the one electric cycle is set to be the second phase range, wherein the control means performs a calculation, in which a phase range from a halfway point in the second phase range to an end of the one electric cycle in the drive table stored in the second storing means is set to be the first phase range according to a start point of the first phase range stored in the first storing means, and makes the drive signal supply means supply the stepping motor with the drive signal, in which the first and second phase ranges are set, on the basis of the drive table after the calculation.

With the construction described above, since the torque control range can be set by setting a phase range from a halfway point in the second phase range to an end of the one electric cycle in the drive table, in which the whole of the one electric cycle is set to be the second phase range, stored in the second storing means to be the first phase range so as to be adapted to the inversion phase characteristic of the stepping motor, therefore the recoil of the driven member from the stopper due to the dispersion in the inversion phase characteristic of the stepping motor can be reduced.

The first storing means stores, as the torque control parameter: a recoil excitation step number as expressing a start point of the first phase range, a recoil excitation step being an excitation step at a start point of a phase range in which a rotation torque in the second rotation direction reverse to the first rotation direction is generated in the stepping motor; and an excitation step number, which is separated from the recoil excitation step number by a quantity of the first phase range, as expressing an end point of the first phase range, wherein the second storing means stores the drive table, in which the whole of the one electric cycle is set to be the second phase range, wherein the control means performs a calculation, in which the first phase range is set to start from a halfway point in the second phase range in the drive table stored in the second storing means according to a start point and an end point of the first phase range stored in the first storing means, and makes the drive signal supply means supply the stepping motor with the drive signal, in which the first and second phase ranges are set, on the basis of the drive table after the calculation.

With the construction described above, in the drive table stored in the second storing means, in which the whole of the one electric cycle is set to be the second phase range, the torque control range can be set by setting the first phase range to start from a halfway point in the second phase range so as to be adapted to the inversion phase characteristic of the stepping motor, therefore the recoil of the driven member from the stopper due to the dispersion in the inversion phase characteristic of the stepping motor can be reduced.

The first storing means stores, as the torque control parameter: a recoil excitation step number as an excitation step of a start point of the first phase range, a recoil excitation step being an excitation step at a start point of a phase range in which a rotation torque in the second rotation direction reverse to the first rotation direction is generated in the stepping motor; and the number of the excitation steps according to the first phase range starting from the recoil excitation step number, wherein the second storing means stores the drive table, in which the whole of the one electric cycle is set to be the second phase range, wherein the control means performs a calculation, in which the first phase range is set to start from a halfway point in the second phase range in the drive table stored in the second storing means according to a start point and the number of the excitation steps of the first phase range stored in the first storing means, and makes the drive signal supply means supply the stepping motor with the drive signal, in which the first and second phase ranges are set, on the basis of the drive table after the calculation.

With the construction described above, in the drive table stored in the second storing means, in which the whole of the one electric cycle is set to be the second phase range, the torque control range can be set by setting the first phase range to start from a halfway point in the second phase range so as to be adapted to the inversion phase characteristic of the stepping motor, therefore the recoil of the driven member from the stopper due to the dispersion in the inversion phase characteristic of the stepping motor can be reduced.

The storing of the torque control parameter into the first storing means is carried out at a stage of inspection of the stepping motor itself or at a stage of inspection of the stepping motor after attaching to a wiring board assembly.

With the construction described above, since the dispersion in the inversion phase characteristic of the individual stepping motor is securely grasped, therefore the torque control adapted to the individual stepping motor becomes possible, in which the movement of the abutting piece upon abutting against the stopper can be reduced.

BRIEF DESCRIPTION OF THE DRAWINGS

FIG. 6 is a flow chart illustrating a processing sequence performed by the CPU 3a in the initialization action of the indicating device shown in FIG. 5;

DESCRIPTION OF THE PREFERRED EMBODIMENTS

In the following, the preferred embodiments of the present invention will be explained with reference to the attached drawings.

First Preferred Embodiment

Figure 1:
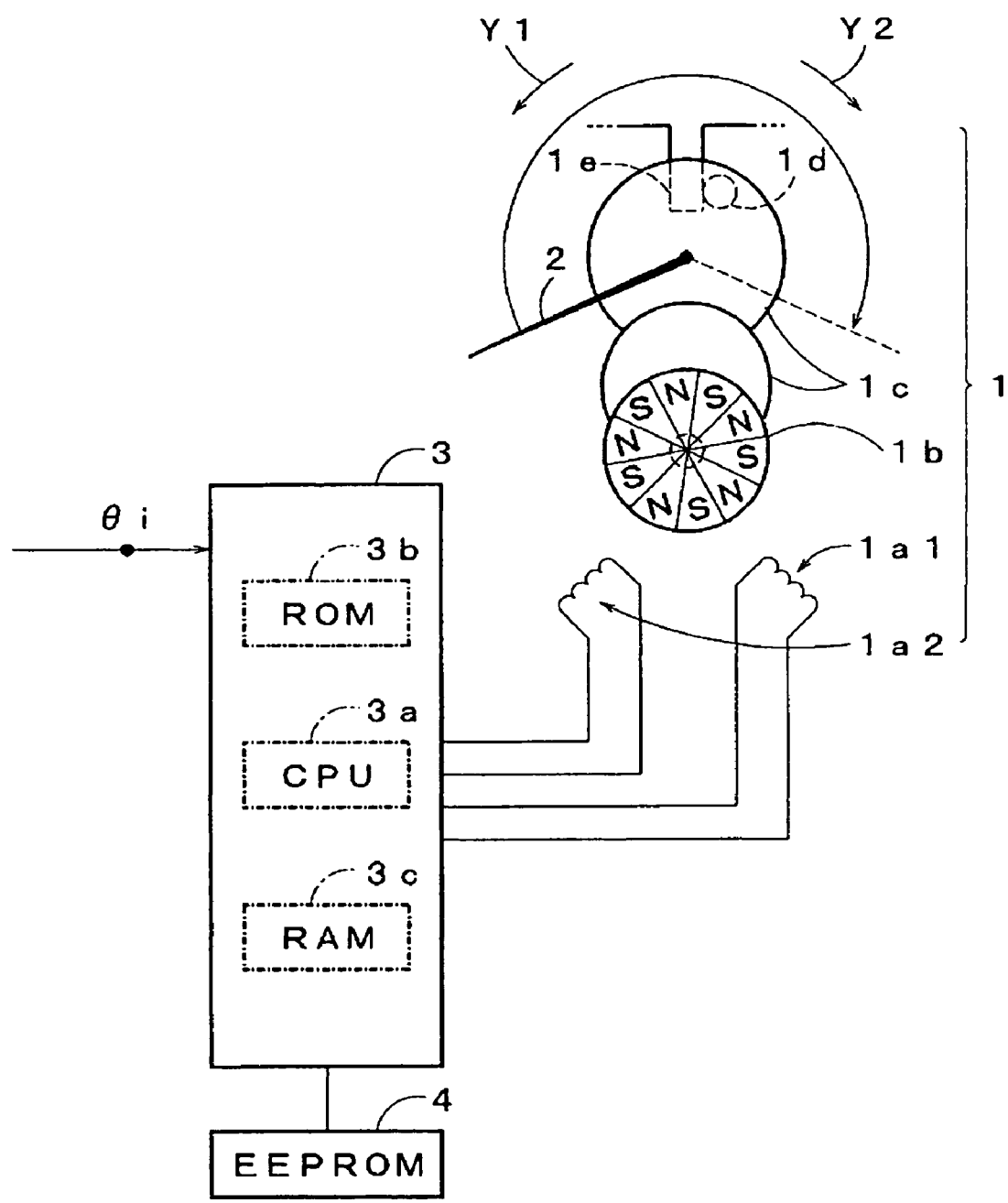
FIG. 1 shows an indicating device equipped with a stepping motor drive according to the first preferred embodiment of the present invention.
Figure 5:
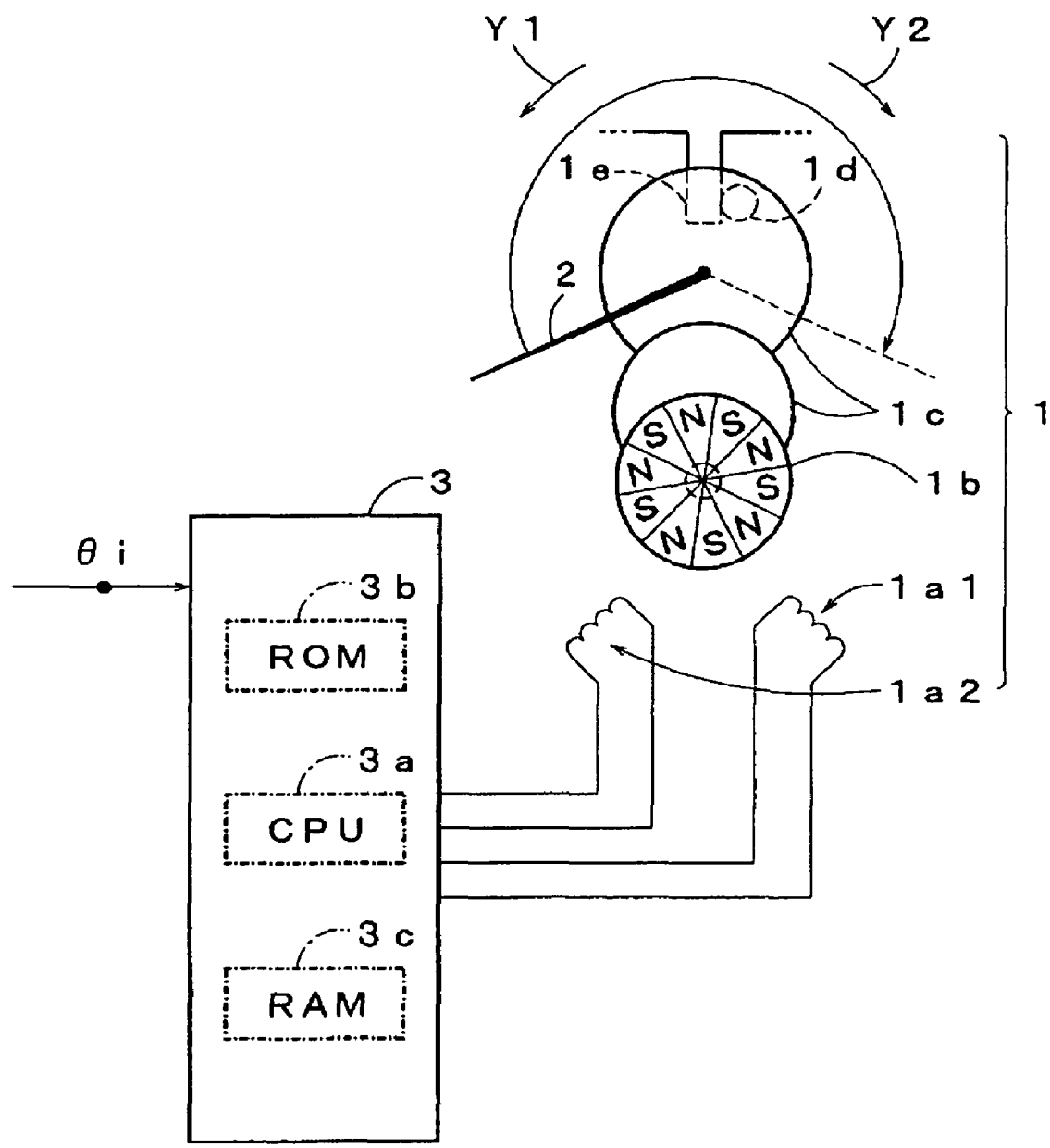
FIG. 5 shows an indicating device equipped with a conventional stepping motor drive.
Figure 7A:
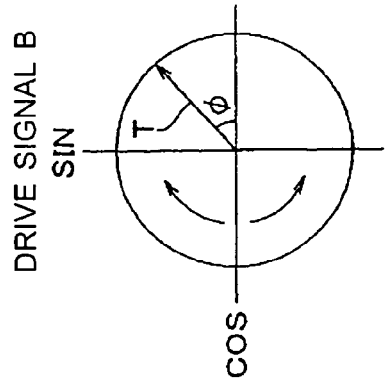
FIG. 7A is an example of a torque control pattern illustrating a relation between a phase $\phi$ of a drive signal B and a rotation torque generated in the stepping motor 1 in the indicating device shown in FIG. 5.
Figure 7B:
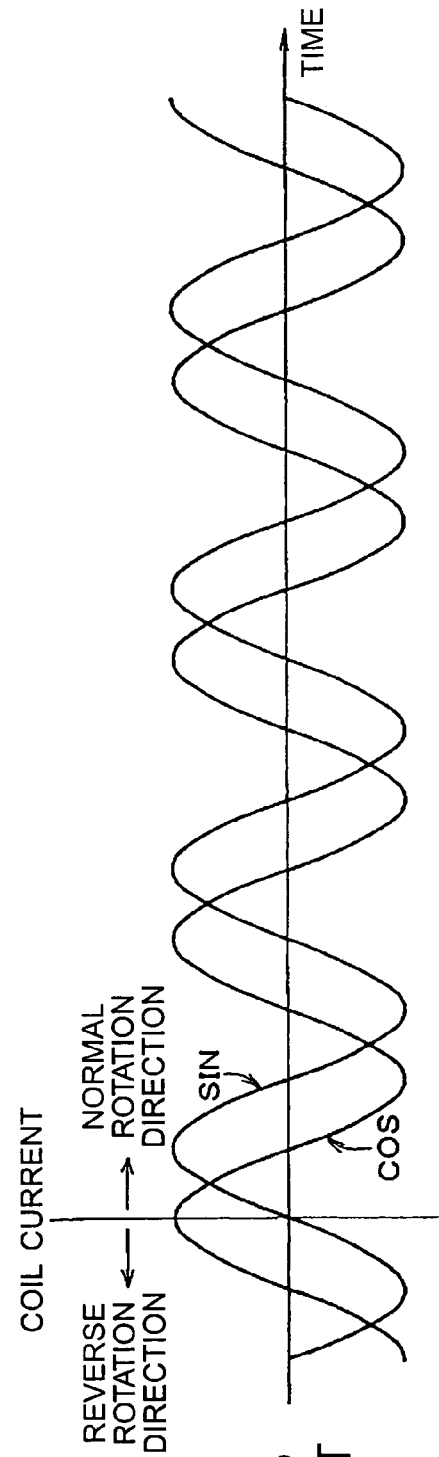
FIG. 7B is a time chart illustrating a COS current and a SIN current based on the torque control pattern shown in FIG. 7A.

FIG. 1 shows an indicating device for use in a vehicle equipped with a stepping motor drive according to the first preferred embodiment of the present invention. The indicating device includes a stepping motor 1, a pointer 2 driven by the stepping motor 1, a driving section 3 controlling rotation of the stepping motor 1, and a rewritable nonvolatile memory EEPROM 4 connected to the driving section 3. That is, the indicating device shown in FIG. 1 is characterized in that there is provided the EEPROM 4 besides a similar construction to that of the indicating device equipped with a conventional stepping motor drive shown in FIG. 5. In the construction of the indicating device shown in FIG. 1, the driving section 3 corresponds to the drive signal supply means, a CPU 3a corresponds to the control means, a ROM 3b corresponds to the second storing means, and the EEPROM 4 corresponds to the first storing means.

The driving section 3 supplies excitation coils 1a1 and 1a2 of the stepping motor 1 with two periodic drive signals, which construct one electric cycle by a plurality of excitation steps and have phases different from each other by 90°, that is, a COS current and a SIN current. For example, one electric cycle is constructed by thirty two excitation steps assigned uniformly.

Figures 8A, 8B:
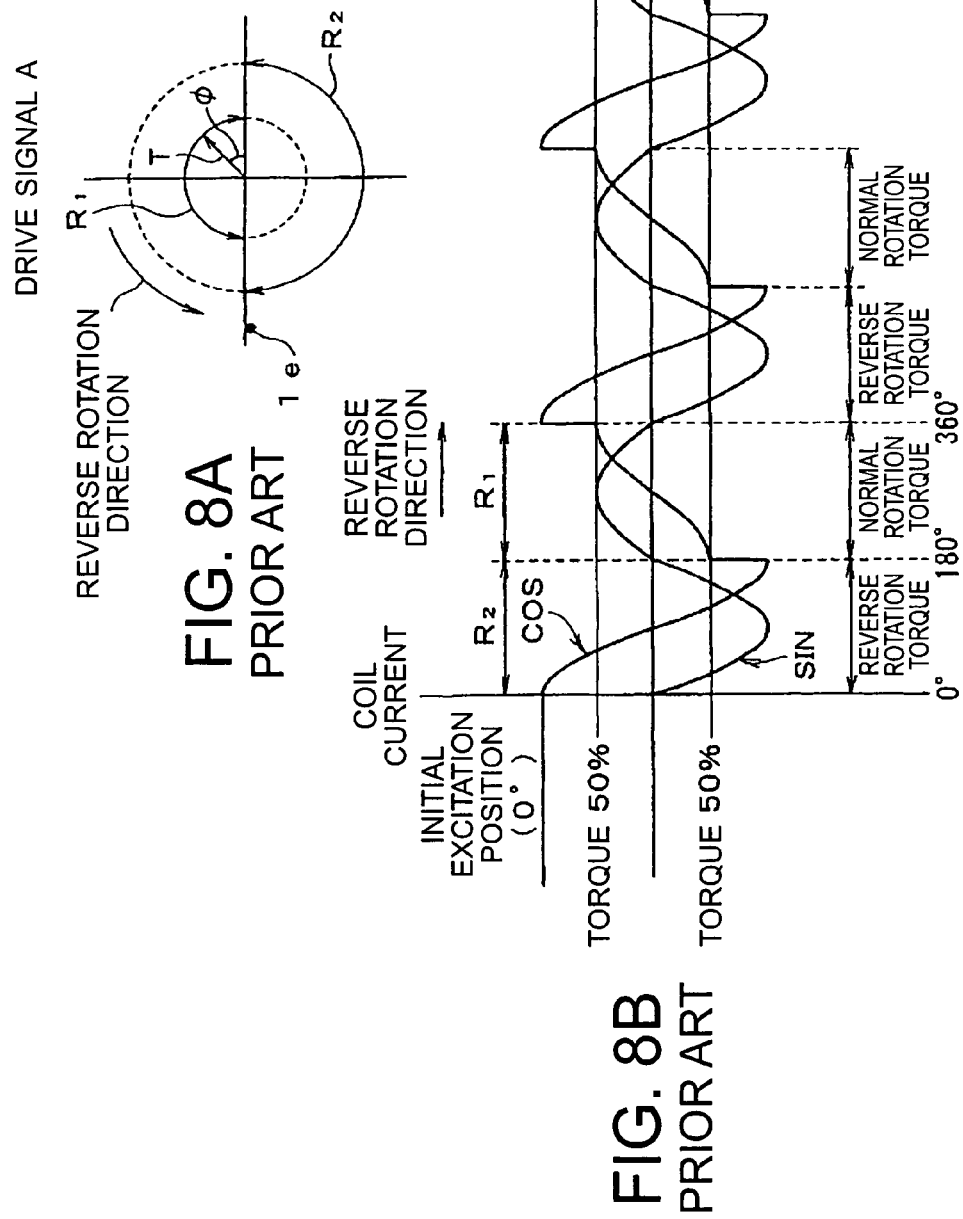
FIG. 8A is an example of a torque control pattern illustrating a relation between a phase $\phi$ of a drive signal A and a rotation torque generated in the stepping motor 1 in the indicating device shown in FIG. 5.
FIG. 8B is a time chart illustrating a COS current and a SIN current based on the torque control pattern shown in FIG. 8A.
Figure 9:
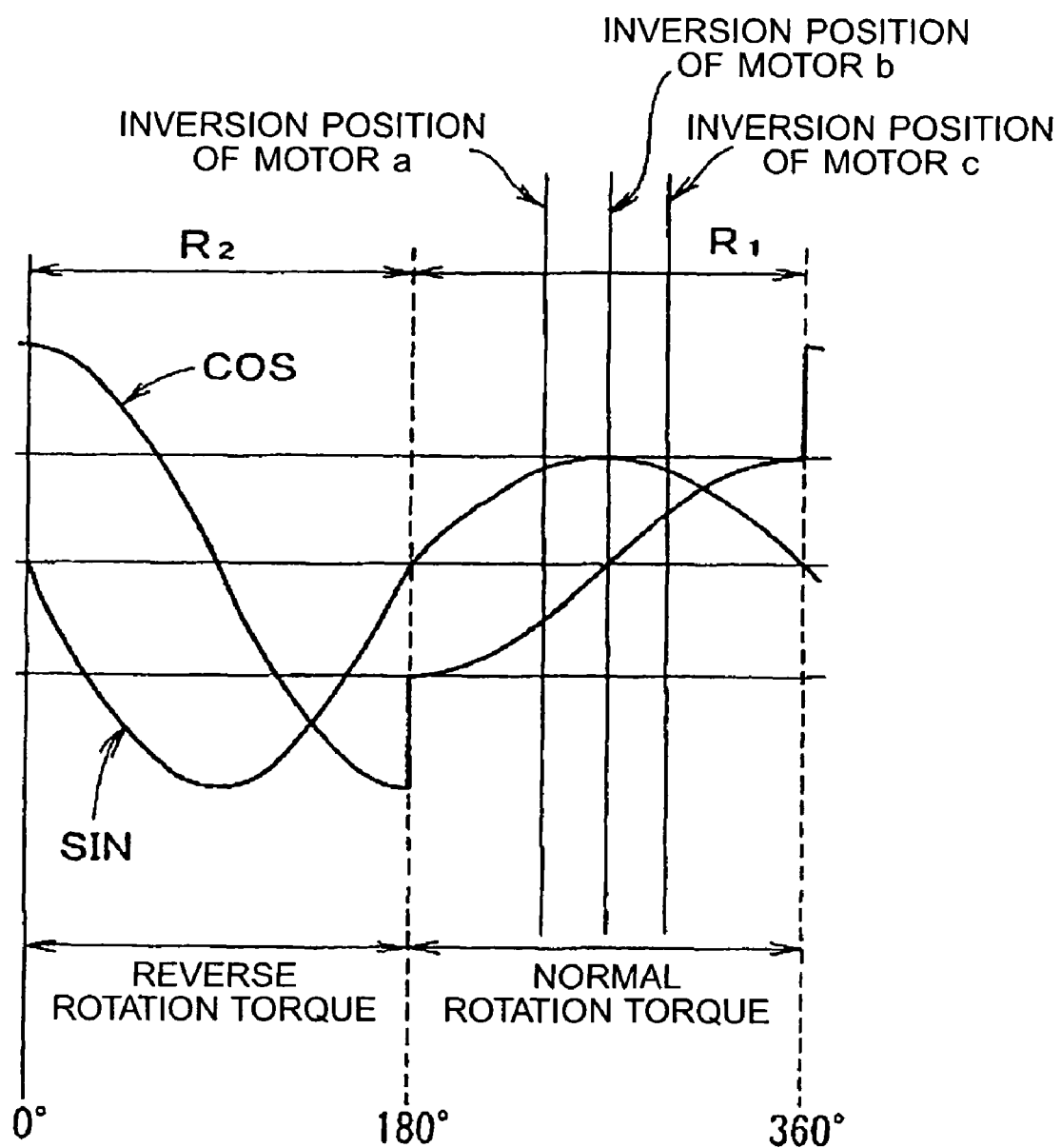
FIG. 9 is a time chart illustrating dispersion in an inversion phase characteristic of the stepping motor with respect to a drive signal A flowing in the excitation coils $1a1$ and $1a2$ in the indicating device shown in FIG. 5.

The ROM 3b in advance stores a plurality of drive tables for setting rotation torque of the drive signal outputted from the driving section 3. As shown in FIGS. 8A and 8B, a plurality of the drive tables includes: (a) a reference drive table having a reference torque control pattern supplying such a drive signal A that a rotation torque generated in the stepping motor 1 when the drive signal is supplied for a phase range R2 (from 0° to 180°) in one electric cycle becomes double as large as a rotation torque when the drive signal is supplied for a remaining phase range, that is, for a phase range R1 (from 180° to 360°); and (b) a plurality of drive tables having torque control patterns, which have the same phase range as the phase range R1 (from 180° to 360°) of the reference drive table and respective start points (i.e. shifted start points before and after 180°) that are different from a start point 180° of the phase range R1 and also different from one another. The phase range R1 corresponds to the first phase range, while the phase range R2 corresponds to the second phase range. The rotation torque generated in the stepping motor 1 when the drive signal is supplied for the phase range R1 (from 180° to 360°) corresponds to the first rotation torque, while the rotation torque when the drive signal is supplied for the phase range R2 (from 0° to 180°) corresponds to the second rotation torque.

The EEPROM 4 in advance stores a torque control parameter relating to torque control upon the initialization action of the stepping motor 1. That is, at a stage of inspection of the stepping motor 1 itself or at a stage of inspection of the stepping motor 1 after attaching to a wiring board assembly of the indicating device, after the driving section 3 supplies the stepping motor 1 with a drive signal B in the reverse rotation direction in which the abutting piece 1d approaches the stopper 1e so that the abutting piece 1d as the driven member abuts against the stopper 1e, a recoil excitation step number, the excitation step being an excitation step when the abutting piece 1d recoils in the normal rotation direction in which the abutting piece 1d leaves the stopper 1e, is detected. The EEPROM 4 in advance stores the recoil excitation step number as the torque control parameter. The reverse rotation direction of the stepping motor 1 in which the abutting piece 1d approaches the stopper 1e corresponds to the first rotation direction, while the normal rotation direction of the stepping motor 1 in which the abutting piece 1d leaves the stopper 1e corresponds to the second rotation direction.

The detection of the recoil excitation step number is carried out by using a known technique disclosed in, for example, Japanese Patent Application Laid-Open No. 2002-112589. That is, for example, by using a push switch (not shown in the figure), when a recoil of the pointer 2 connected with the abutting piece 1d is visually confirmed, the push switch is pressed, so that an excitation step number at that time is detected by the CPU 3a as the recoil excitation step number and stored in the EEPROM 4.

The recoil excitation step number to be stored in the EEPROM 4 reflects an inversion phase characteristic intrinsic to the stepping motor 1. When dispersion takes place in the inversion phase characteristic, the recoil excitation step numbers differ from one another depending on the individual stepping motor. The recoil excitation step number shows a start point of the recoil and its phase angle corresponds to a phase angle of a start point in the phase range R1 in the drive signal A which is supplied upon the initialization action.

Then, upon the initialization action, the CPU 3a reads out the recoil excitation step number as the torque control parameter stored in the EEPROM 4, selects a drive table having a phase angle of a start point of the phase range R1 from a plurality of the drive tables in the ROM 3b, which drive table is adapted to a phase angle of the read-out recoil excitation step number, and supplies a drive signal A of a torque control pattern by the phase ranges R1 and R2 of the selected drive table to the excitation coils 1a1 and 1a2 of the stepping motor 1.

For example, when a recoil excitation step number stored in the EEPROM 4 is 16, a phase angle corresponding to the recoil excitation step number 16 is 180°, and the CPU 3a selects a reference drive table, which has a phase angle 180° of a start point and a phase angle 360° of an end point of the phase range R1, from a plurality of the drive tables in the ROM 3b and supplies a drive signal A of a torque control pattern by the phase ranges R1 and R2 of the selected drive table to the excitation coils 1a1 and 1a2 of the stepping motor 1. In this case, the action is the same as that when the drive signal A shown in FIG. 8 is supplied.

Figure 2A:
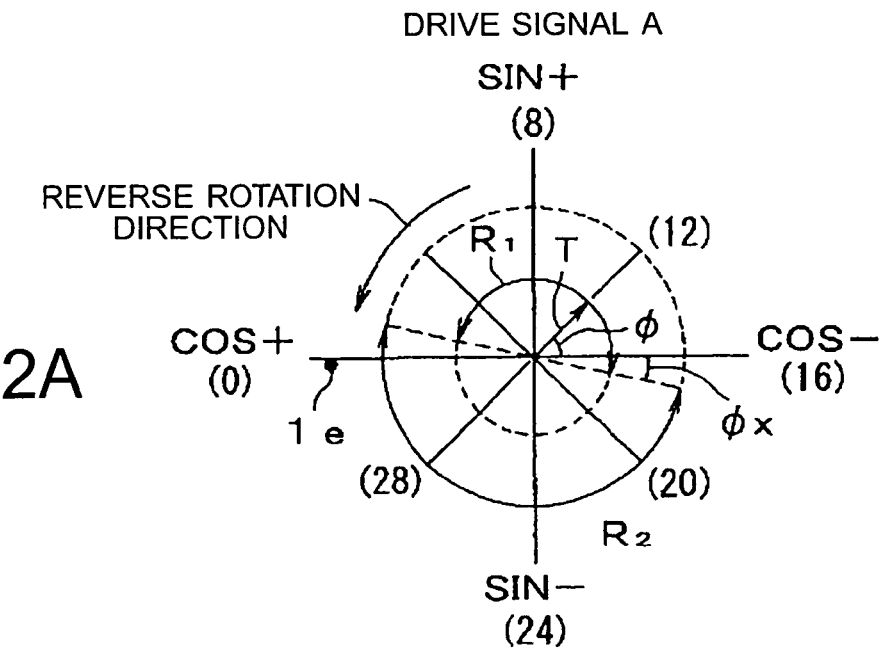
FIG. 2A is an example of a torque control pattern illustrating a relation between a phase $\phi$ of a drive signal A and a rotation torque generated in the stepping motor 1 in the indicating device shown in FIG. 1.
Figure 2B:
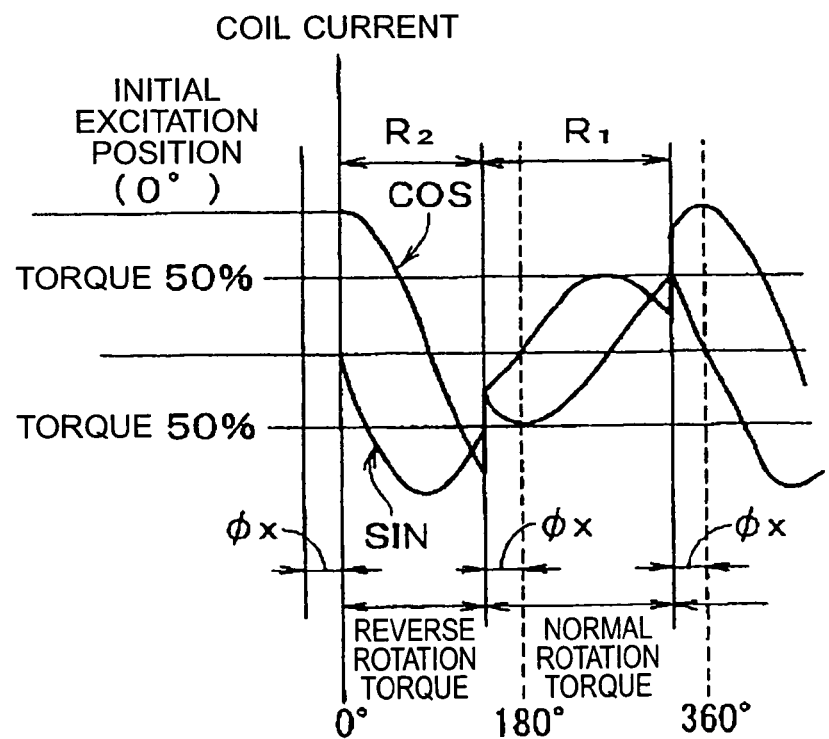
FIG. 2B is a time chart illustrating a COS current and a SIN current based on the torque control pattern shown in FIG. 2A.

As shown in FIGS. 2A and 2B, when a recoil excitation step number stored in the EEPROM 4 is larger than 16 and a phase angle corresponding to the recoil excitation step number is (180°−ϕx), the CPU 3a selects a reference drive table, which has a phase angle (180°−ϕx) of a start point and a phase angle (360°−ϕx) of an end point of the phase range R1, from a plurality of the drive tables in the ROM 3b and supplies a drive signal A of a torque control pattern by the phase ranges R1 and R2 of the selected drive table to the excitation coils 1a1 and 1a2 of the stepping motor 1.

FIG. 2A is an example of a torque control pattern illustrating a relation between a phase ϕ of the drive signal A and a rotation torque generated in the stepping motor 1 in the indicating device shown in FIG. 1. FIG. 2B is a time chart illustrating a COS current and a SIN current based on the torque control pattern shown in FIG. 2A.

Thereby, a normal rotation torque upon the recoiling becomes 50% for a phase range R1 from (180°−ϕx) to (360°−ϕx) and the rotation torque becomes smaller in the whole phase range in which the recoiling takes place, without any shift between the phase range R1 (from 180° to 360°) of the set torque control pattern and the phase range in which an actual recoiling takes place, therefore the movement of the abutting piece 1d and that of the pointer 2 is reduced.

Figure 3A:
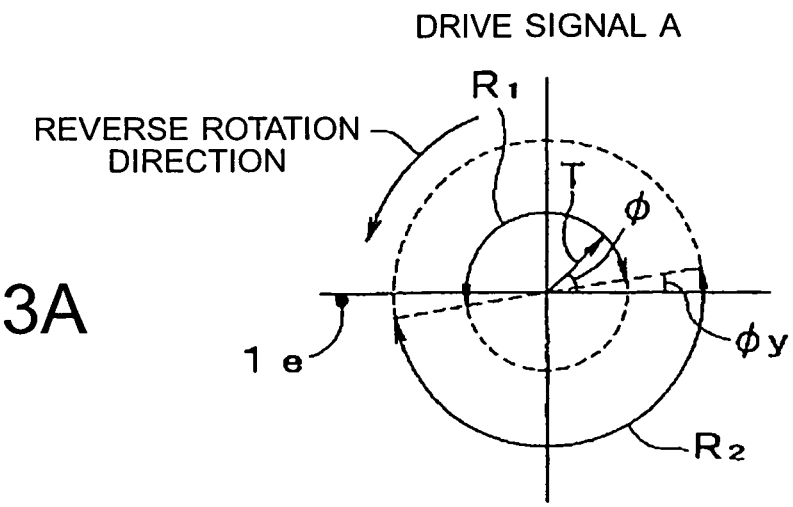
FIG. 3A is another example of a torque control pattern of a drive signal A in the indicating device shown in FIG. 1.
Figure 3B:
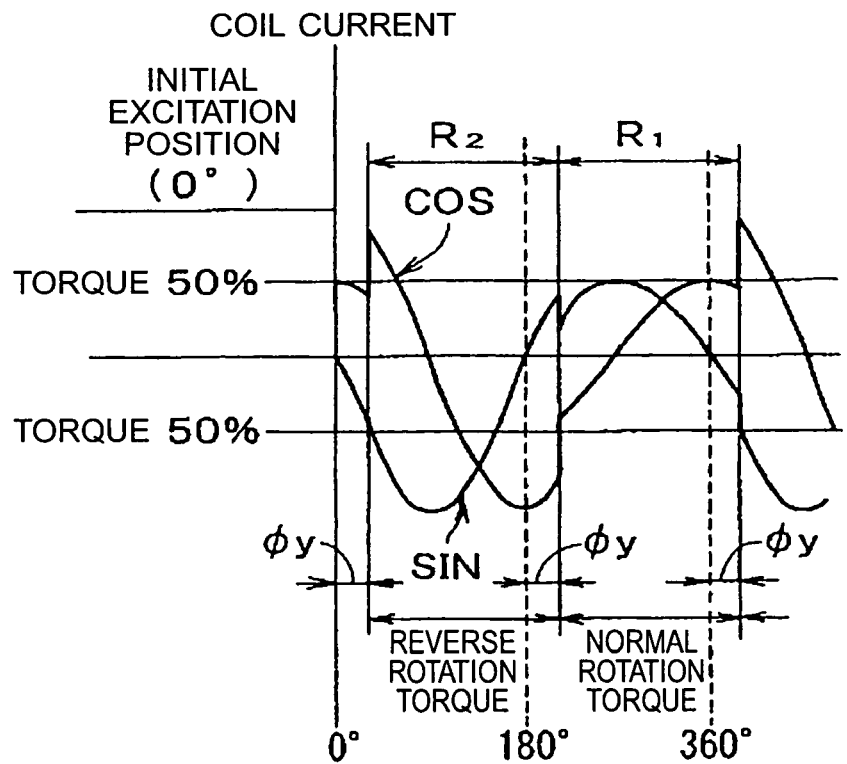
FIG. 3B is a time chart illustrating a COS current and a SIN current based on the torque control pattern shown in FIG. 3A.

Similarly, as shown in FIGS. 3A and 3B, when a recoil excitation step number stored in the EEPROM 4 is smaller than 16 and a phase angle corresponding to the recoil excitation step number is (180°+ϕy), the CPU 3a selects a reference drive table, which has a phase angle (180°+ϕy) of a start point and a phase angle (360°+ϕy) of an end point of the phase range R1, from a plurality of the drive tables in the ROM 3b and supplies a drive signal A of a torque control pattern by the phase ranges R1 and R2 of the selected drive table to the excitation coils 1a1 and 1a2 of the stepping motor 1.

FIG. 3A is a torque control pattern in such a case. FIG. 3B is a time chart illustrating a COS current and a SIN current based on the torque control pattern shown in FIG. 3A.

Thereby, a normal rotation torque upon the recoiling becomes 50% for a phase range R1 from (180°+ϕy) to (360°+ϕy) and the rotation torque becomes smaller in the whole phase range in which the recoiling takes place, without any shift between the phase range R1 (from 180° to 360°) of the set torque control pattern and the phase range in which an actual recoiling takes place, therefore the movement of the abutting piece 1d and that of the pointer 2 is reduced.

Figure 4:
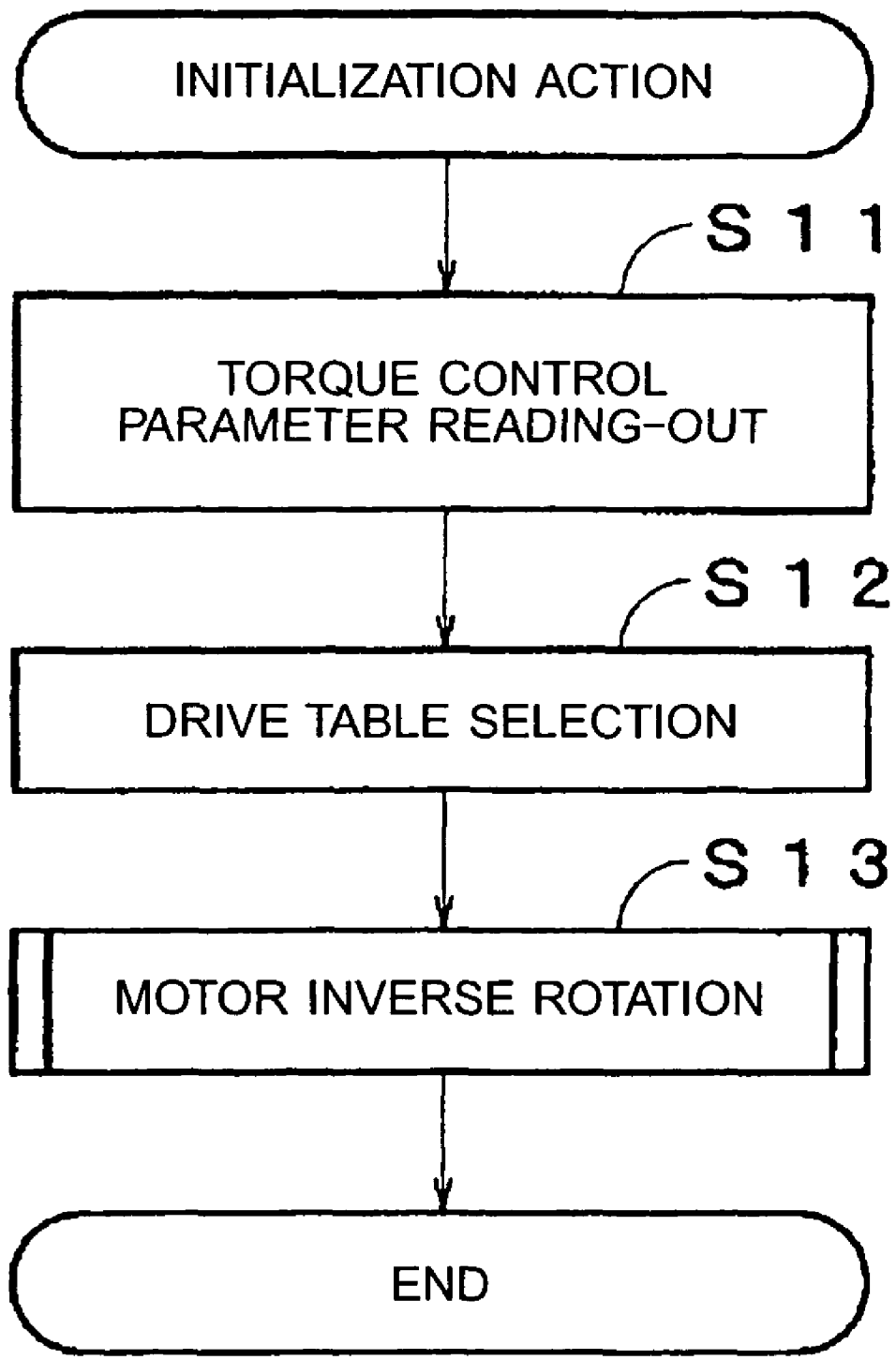
FIG. 4 is a flow chart illustrating a processing sequence performed by the CPU 3a in the initialization action of the indicating device shown in FIG. 1.

In the following, a processing sequence of the initialization action performed by the CPU 3a will be explained with reference to a flow chart shown in FIG. 4. When the power supply is inputted from an on-vehicle battery, the CPU 3a starts the initialization action. First, the CPU 3a reads out a torque control parameter in advance stored in the EEPROM 4 (step S11). Thereafter, on the basis of the read-out torque control parameter, the CPU 3a selects a drive table adapted to the torque control parameter from a plurality of the drive control tables in the ROM 3b (step S12). Thereafter, the CPU 3a performs a reverse rotation processing of the stepping motor 1 using a drive signal A based on the selected drive table (step S13). Such a processing at step S13 is performed by carrying out the steps S1-S4 shown in FIG. 6.

Thus, according to the first preferred embodiment, even when there is dispersion in a phase angle generating characteristic upon manufacturing the stepping motor 1 for use in the indicating device, a torque control range can be set on the basis of the recoil excitation step number intrinsic to the stepping motor in advance stored in the EEPROM 4, therefore the recoil of the abutting piece 1d from the stopper 1e is reduced without being affected by dispersion in an inversion phase characteristic of the stepping motor and therefore, the movement of the pointer 2 upon the initialization action can be reduced.

Second Preferred Embodiment

In the following, the second preferred embodiment of the present invention will be explained. In the first preferred embodiment described above, a plurality of the drive tables including the reference drive table are in advance stored in the ROM 3b. Instead, in the second preferred embodiment, only one reference drive table having the reference torque control pattern shown in FIG. 8 is in advance stored in the ROM 3b.

Upon the initialization action, the CPU 3a reads out a recoil excitation step number as a torque control parameter stored in a EEPROM 4, shifts the drive table in such a manner that a start point of a phase range R1 in the reference drive table in the ROM 3b coincides with the read-out recoil excitation step number, and supplies the excitation coils 1a1 and 1a2 of the stepping motor 1 with the drive signal A of the torque control pattern by the phase ranges R1 and R2 of the shifted drive table.

Thereby, the torque control range can be set by shifting the drive table stored in the ROM 3b so as to be adapted to an inversion phase characteristic of the stepping motor, therefore the recoil of the driven member from the stopper due to the dispersion in the inversion phase characteristic of the stepping motor can be reduced.

Third Preferred Embodiment

In the following, the third preferred embodiment of the present invention will be explained. In the first preferred embodiment described above, a plurality of the drive tables including the reference drive table are in advance stored in the ROM 3b. Instead, in the third preferred embodiment, the drive table is calculated on the basis of torque control parameter stored in the EEPROM 4 without storing the drive tables in advance. In this case, an excitation step displacement and torque correction coefficient for calculating the drive table are in advance stored in the ROM 3b (or in EEPROM 4).

That is, upon the initialization action, the CPU 3a reads out a recoil excitation step number as a torque control parameter stored in a EEPROM 4, calculates the drive table of the torque control pattern by the phase ranges R1 and R2, in which the read-out recoil excitation step number is set to be a start point of the phase range R1, by using the excitation step displacement and torque correction coefficient in advance stored in the ROM 3b (or in EEPROM 4), and supplies a drive signal A by the calculated drive table to the excitation coils 1a1 and 1a2 of the stepping motor 1.

Thereby, the torque control range can be calculated and set on the basis of the recoil excitation step number intrinsic to the stepping motor, therefore the recoil of the driven member from the stopper due to the dispersion in the inversion phase characteristic of the stepping motor can be reduced.

Fourth Preferred Embodiment

In the following, the fourth preferred embodiment of the present invention will be explained. In the second preferred embodiment described above, only one reference drive table having the reference torque control pattern shown in FIG. 8, in which the phase ranges R1 and R2 are set, is in advance stored in the ROM 3b. Instead, in the fourth preferred embodiment, only one drive table having a torque control pattern, in which the whole of one electric cycle is set to be the phase range R2, is in advance in the ROM 3b, while a recoil excitation step number is stored in the EEPROM 4 as expressing a start point of the phase range R1.

That is, upon the initialization action, the CPU 3a reads out a recoil excitation step number as a torque control parameter stored in a EEPROM 4, performing a calculation in which the phase range R1 having a start point of the read-out recoil excitation step number takes the place of a phase range from a halfway point of the phase range R2 to an end point of one electric cycle in the drive table in the ROM 3b, and supplies a drive signal A by the calculated drive table to the excitation coils 1a1 and 1a2 of the stepping motor 1.

Thereby, in the drive table stored in the ROM 3b in which the whole of one electric cycle is set to be the phase range R2, the torque control range can be set by setting a phase range from a halfway in the phase range R2 to an end point of the one electric cycle to be the phase range R1 so as to be adapted to an inversion phase characteristic of the stepping motor, therefore the recoil of the driven member from the stopper due to the dispersion in the inversion phase characteristic of the stepping motor can be reduced.

Fifth Preferred Embodiment

In the following, the fifth preferred embodiment of the present invention will be explained. In the third preferred embodiment described above, a recoil excitation step number is stored in the ROM 3b or in the EEPROM 4 as expressing a start point of the phase range R1. Instead, in the fifth preferred embodiment, a recoil excitation step number is stored as expressing a start point of the phase range R1 and an excitation step number being separated from the recoil excitation step number by the phase range R1 is stored as expressing an end point of the phase range R1.

That is, upon the initialization action, the CPU 3a reads out a recoil excitation step number as a torque control parameter stored in the EEPROM 4 and an excitation step number being separated from the recoil excitation step number by the phase range R1, performing a calculation in which the phase range R1 having a start point and end point, which are the read-out recoil excitation step number and the excitation step number being separated from the recoil excitation step number by the phase range R1, respectively, is replaced by a phase range which starts from a halfway point in the phase range R2 in the drive table stored in the ROM 3b, and supplies a drive signal A by the calculated drive table to the excitation coils 1a1 and 1a2 of the stepping motor 1.

Thereby, in the drive table stored in the ROM 3b in which the whole of one electric cycle is set to be the phase range R2, the torque control range can be set by setting a phase range from a halfway in the phase range R2 to an end point of the one electric cycle to be the phase range R1 so as to be adapted to an inversion phase characteristic of the stepping motor, therefore the recoil of the driven member from the stopper due to the dispersion in the inversion phase characteristic of the stepping motor can be reduced.

Sixth Preferred Embodiment

In the following, the sixth preferred embodiment of the present invention will be explained. In the third preferred embodiment described above, a recoil excitation step number is stored in the ROM 3b or in the EEPROM 4 as expressing a start point of the phase range R1. Instead, in the sixth preferred embodiment, a recoil excitation step number is stored as expressing a start point of the phase range R1 and the number of the excitation steps corresponding to the phase range R1 is stored from the recoil excitation step number.

That is, upon the initialization action, the CPU 3a reads out a recoil excitation step number as a torque control parameter and the number of the excitation steps stored in the EEPROM 4, performs a calculation in which the phase range R1 is set to start from a halfway point in the phase range R2 from the read-out recoil excitation step number and the number of the excitation steps, and supplies a drive signal A by the calculated drive table to the excitation coils 1a1 and 1a2 of the stepping motor 1.

Thereby, in the drive table stored in the ROM 3b in which the whole of one electric cycle is set to be the phase range R2, the torque control range can be set by setting a phase range from a halfway in the phase range R2 to an end point of the one electric cycle to be the phase range R1 so as to be adapted to an inversion phase characteristic of the stepping motor, therefore the recoil of the driven member from the stopper due to the dispersion in the inversion phase characteristic of the stepping motor can be reduced.

The present invention has the following advantages:

(1) By in advance storing a torque control parameter intrinsic to individual stepping motors, a drive table controlling a rotation torque of the stepping motor upon initialization action can be set according to the individual stepping motors, therefore the movement of the pointer upon the initialization action can be prevented from occurring.

(2) A step of the torque control and a start of the control of the stepping motor are stored as torque control parameters intrinsic to the stepping motor without exhibiting recoil movement, therefore a low-cost torque control for preventing the recoil movement from occurring adapted to the individual stepping motor.

(3) At a stage of inspection of the stepping motor itself or at a stage of inspection of the stepping motor after attaching to a wiring board assembly, for example, the recoil excitation step number as the torque control parameter is stored, so that a smooth movement of the pointer when returning to a zero point can be attained without being affected by dispersion in the inversion phase characteristic of the individual stepping motors.

The aforementioned preferred embodiments are described to aid in understanding the present invention and variations may be made by one skilled in the art without departing from the spirit and scope of the present invention.

For example, in the preferred embodiments described above, the recoil excitation step number as the torque control parameter is in advance stored. However, instead, an abutting excitation step number when the abutting piece 1d abuts against the stopper 1e may be in advance stored, so that the drive table is calculated on the basis of the abutting excitation step number. In such a case, since the abutting excitation step number is an excitation step number shifted from the recoil excitation step number by the number of the excitation steps corresponding to a half of one electric cycle, therefore similarly to the recoil excitation step number, the abutting excitation step number can be the torque control parameter.

Furthermore, in the preferred embodiments described above, the drive table is stored in the ROM 3b. However, instead, the drive table may be stored in the EEPROM 4.

What is claimed is:

1. A stepping motor drive comprising:
a drive signal supply means which supplies a plurality of periodic drive signals, which construct one electric cycle by a plurality of excitation steps and have different phases from each other to generate a rotation torque in a stepping motor, wherein the drive signal supply means supplies the drive signal so that a first rotation torque generated in the stepping motor in a first phase range of one electric cycle of the drive signal becomes smaller than a second rotation torque generated in the stepping motor in a second phase range which is a remaining phase range other than the first phase range of the one electric cycle;
a control means which makes the drive signal supply means supply the drive signal upon a initialization action in which a driven member connected with rotation of the stepping motor is made abut against a stopper, wherein on a condition that the driven member abuts against the stopper by a rotation in a first rotation direction in which the driven member approaches the stopper, when the drive signal supply means continues to supply the drive signal of the first rotation direction, the first phase range includes a phase range in which a rotation torque in a second rotation direction reverse to the first rotation direction is generated in the stepping motor; and
a first storing means which stores a torque control parameter according to an inversion phase characteristic intrinsic to the stepping motor,
wherein the control means makes the drive signal supply means supply the drive signal, in which the first and second phase ranges are set on the basis of the torque control parameter stored in the first storing means, to the stepping motor.

2. The stepping motor drive according to claim 1, wherein the first storing means stores, as the torque control parameter, a recoil excitation step number, a recoil excitation step being an excitation step at a start point of a phase range in which a rotation torque in the second rotation direction reverse to the first rotation direction is generated in the stepping motor,
wherein the control means computes a drive table for setting the rotation torque of the drive signal including the first and second phase ranges on the basis of the recoil excitation step number stored in the first storing means, and makes the drive signal supply means supply the stepping motor with the drive signal, in which the first and second phase ranges are set, on the basis of the computed drive table.

3. The stepping motor drive according to claim 1 further comprising a second storing means which stores a drive table for setting the rotation torque of the drive signal, wherein the control means makes the drive signal supply means supply the stepping motor with the drive signal, in which the first and second phase ranges are set, on the basis of the torque control parameter stored in the first storing means and the drive table stored in the second storing means.

4. The stepping motor drive according to claim 3, wherein the first storing means stores, as the torque control parameter, a recoil excitation step number, a recoil excitation step being an excitation step at a start point of a phase range in which a rotation torque in the second rotation direction reverse to the first rotation direction is generated in the stepping motor, wherein the second storing means stores a plurality of the drive tables having different start points of the first phase range from each other, each said drive table including the first and second phase ranges, wherein the control means selects the drive table, in which the start point of the first phase range is adapted to the recoil excitation step number stored in the first storing means, from a plurality of the drive tables stored in the second storing means, and makes the drive signal supply means supply the stepping motor with the drive signal, in which the first and second phase ranges are set, on the basis of the selected drive table.

5. The stepping motor drive according to claim 3, wherein the first storing means stores, as the torque control parameter, a recoil excitation step number, a recoil excitation step being an excitation step at a start point of a phase range in which a rotation torque in the second rotation direction reverse to the first rotation direction is generated in the stepping motor, wherein the second storing means stores the drive table including the first and second phase ranges, wherein the control means shifts the drive table so that a start point of the first phase range in the drive table stored in the second storing means coincides with the recoil excitation step number stored in the first storing means, and makes the drive signal supply means supply the stepping motor with the drive signal, in which the first and second phase ranges are set, on the basis of the shifted drive table.

6. The stepping motor drive according to claim 3, wherein the first storing means stores, as the torque control parameter, a recoil excitation step number as expressing a start point of the first phase range, a recoil excitation step being an excitation step at a start point of a phase range in which a rotation torque in the second rotation direction reverse to the first rotation direction is generated in the stepping motor, wherein the second storing means stores the drive table, in which the whole of the one electric cycle is set to be the second phase range, wherein the control means performs a calculation, in which a phase range from a halfway point in the second phase range to an end of the one electric cycle in the drive table stored in the second storing means is set to be the first phase range according to a start point of the first phase range stored in the first storing means, and makes the drive signal supply means supply the stepping motor with the drive signal, in which the first and second phase ranges are set, on the basis of the drive table after the calculation.

7. The stepping motor drive according to claim 3, wherein the first storing means stores, as the torque control parameter: a recoil excitation step number as expressing a start point of the first phase range, a recoil excitation step being an excitation step at a start point of a phase range in which a rotation torque in the second rotation direction reverse to the first rotation direction is generated in the stepping motor; and an excitation step number, which is separated from the recoil excitation step number by a quantity of the first phase range, as expressing an end point of the first phase range, wherein the second storing means stores the drive table, in which the whole of the one electric cycle is set to be the second phase range, wherein the control means performs a calculation, in which the first phase range is set to start from a halfway point in the second phase range in the drive table stored in the second storing means according to a start point and an end point of the first phase range stored in the first storing means, and makes the drive signal supply means supply the stepping motor with the drive signal, in which the first and second phase ranges are set, on the basis of the drive table after the calculation.

8. The stepping motor drive according to claim 3, wherein the first storing means stores, as the torque control parameter: a recoil excitation step number as an excitation step of a start point of the first phase range, a recoil excitation step being an excitation step at a start point of a phase range in which a rotation torque in the second rotation direction reverse to the first rotation direction is generated in the stepping motor; and the number of the excitation steps according to the first phase range starting from the recoil excitation step number, wherein the second storing means stores the drive table, in which the whole of the one electric cycle is set to be the second phase range, wherein the control means performs a calculation, in which the first phase range is set to start from a halfway point in the second phase range in the drive table stored in the second storing means according to a start point and the number of the excitation steps of the first phase range stored in the first storing means, and makes the drive signal supply means supply the stepping motor with the drive signal, in which the first and second phase ranges are set, on the basis of the drive table after the calculation.

9. The stepping motor drive according to claim 1, wherein the storing of the torque control parameter into the first storing means is carried out at a stage of inspection of the stepping motor itself or at a stage of inspection of the stepping motor after attaching to a wiring board assembly.

* * * * *